United States Patent
Gintis (10) Patent No.: US 10,176,068 B2
(45) Date of Patent: Jan. 8, 2019

(54) METHODS, SYSTEMS, AND COMPUTER READABLE MEDIA FOR TOKEN BASED MESSAGE CAPTURE

(71) Applicant: Ixia, Calabasas, CA (US)

(72) Inventor: Noah Steven Gintis, Westlake Village, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 109 days.

(21) Appl. No.: 15/364,056

(22) Filed: Nov. 29, 2016

(65) Prior Publication Data

US 2018/0150371 A1 May 31, 2018

(51) Int. Cl.
G06F 11/263 (2006.01)
G06F 11/273 (2006.01)
G06F 11/10 (2006.01)

(52) U.S. Cl.
CPC ........ *G06F 11/263* (2013.01); *G06F 11/1004* (2013.01); *G06F 11/2733* (2013.01)

(58) Field of Classification Search
CPC ............................ G06F 11/263; G06F 11/2733
See application file for complete search history.

(56) References Cited

U.S. PATENT DOCUMENTS

| | | |
|---|---|---|
| 6,961,429 B1 | 11/2005 | Hill et al. |
| 8,417,478 B2 | 4/2013 | Gintis et al. |
| 8,571,032 B2 | 10/2013 | Regev |
| 8,724,498 B2 | 5/2014 | Choi et al. |
| 8,730,826 B2 | 5/2014 | Regev |
| 8,745,381 B2 | 6/2014 | Badea |
| 8,855,070 B2 | 10/2014 | Deng et al. |
| 8,937,882 B2 | 1/2015 | Devarasetty |
| 9,071,995 B2 | 6/2015 | Asokan et al. |
| 9,252,956 B2 | 2/2016 | Falk |
| 9,253,062 B2 | 2/2016 | Das et al. |
| 2002/0142797 A1 | 10/2002 | Tarighi et al. |
| 2007/0011676 A1 | 1/2007 | Sahita et al. |
| 2008/0016408 A1* | 1/2008 | Abernathy .......... G06F 11/3636 714/45 |
| 2008/0075079 A1 | 3/2008 | Smith |
| 2009/0172664 A1* | 7/2009 | Mostafa .............. G06F 9/45504 718/1 |

(Continued)

OTHER PUBLICATIONS

Non-Final Office Action for U.S. Appl. No. 15/079,016 (dated Sep. 11, 2017).

(Continued)

*Primary Examiner* — Jigar P Patel (57) ABSTRACT

Methods, systems, and computer readable media for token based message capture are disclosed. One method includes generating a test message including a token indicative of message data and a data integrity check value (DICV) computed based on at least a portion of the message data. The method also includes sending the test message to a system under test (SUT). The method further includes receiving, from the SUT, a version of the test message, wherein the version of the test message includes the token and the DICV. The method also includes storing a representation of the version of the test message using the token and the DICV.

15 Claims, 8 Drawing Sheets

(56) References Cited

U.S. PATENT DOCUMENTS

| | | | | |
|---|---|---|---|---|
| 2012/0166874 A1* | 6/2012 | Bernardez | ............... | H04M 1/24 |
| | | | | 714/26 |
| 2013/0103940 A1* | 4/2013 | Badea | ..................... | H04L 43/50 |
| | | | | 713/160 |
| 2015/0365426 A1 | 12/2015 | Henocque | | |
| 2016/0165225 A1* | 6/2016 | Djurdjevic | ................ | G06T 7/80 |
| | | | | 348/187 |
| 2017/0277612 A1 | 9/2017 | Regev et al. | | |

OTHER PUBLICATIONS

Final Office Action for U.S. Appl. No. 15/079,016 (dated Jan. 24, 2018).

Notice of Allowance and Fee(s) Due for U.S. Appl. No. 15/079,016 (dated Apr. 25, 2018).

"IxLoad® —Data Test Solution," Ixia Data Sheet, 915-3613-01-5061 Rev A, pp. 1-26 (Publication Date Unknown).

Commonly-assigned, co-pending U.S. Appl. No. 15/079,016 for "Methods, Systems, and Computer Readable Media for Providing an Anticipated Data Integrity Check," (Unpublished, filed Mar. 23, 2016).

* cited by examiner

FIG. 1

| TEST MESSAGE TOKEN | VALIDATION RULE IDs | VALIDATION MAPS (E.G., BITS TO CHECK) |
|---|---|---|
| 1 | 0 | 0-256 |
| 2 | 1 | 0-48, 97-103 |
| 3 | 0 | 0-256 |
| 4 | 1 | 0-48, 97-103 |
| 5 | 2 | 65-72 |

METHODS, SYSTEMS, AND COMPUTER READABLE MEDIA FOR TOKEN BASED MESSAGE CAPTURE

TECHNICAL FIELD

The subject matter described herein relates to processing information. More specifically, the subject matter relates to methods, systems, and computer readable media for token based message capture.

BACKGROUND

Message capture, also known as packet capture, generally involves reading and storing data messages (e.g., packets, frames, data units, etc.). For example, traffic analyzers may include programs and/or network tools to monitor and store network traffic such that a network operator or other user can analyze the network traffic by inspecting individual data packets.

Issues associated with message capture typically involve costs and number of resources needed to capture traffic associated with high bandwidth links. For example, to capture traffic traversing a 100 gigabit per second data link, network operators generally require message capture solutions that are expensive and require significant resources (e.g., numerous processors and storage devices). However, such message capture solutions are generally cost prohibitive for network traffic related testing purposes.

Accordingly, it can be beneficial to perform efficient and cost effective message capture for network traffic related testing purposes.

SUMMARY

Methods, systems, and computer readable media for token based message capture are disclosed. One method includes generating a test message including a token indicative of message data and a data integrity check value (DICV) computed based on at least a portion of the message data. The method also includes sending the test message to a system under test (SUT). The method further includes receiving, from the SUT, a version of the test message, wherein the version of the test message includes the token and the DICV. The method also includes storing a representation of the version of the test message using the token and the DICV.

One system includes least one processor, a memory, and a message generation module (MGM) implemented using the at least one processor and the memory. The MGM is configured for generating a test message including a token indicative of message data and a DICV computed based on at least a portion of the message data; for sending the test message to a system under test (SUT); for receiving, from the SUT, a version of the test message, wherein the version of the test message includes the token and the DICV; and for storing a representation of the version of the test message using the token and the DICV.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to at least one physical computing platform including at least one processor and memory.

As used herein, the terms "function" or "module" refer to hardware, firmware, or software in combination with hardware and/or firmware for implementing features described herein.

As used herein, the term "test message" refers to any message or data unit usable for testing purposes. For example, a test message may include various data units, such as a packet, a frame, a datagram, a user datagram protocol (UDP) message, a transmission control protocol (TCP) message, or, more generally, a protocol data unit (PDU).

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for token based message capture. When testing one or more computing or networking resources, it may be desirable to test the resources under non-trivial load conditions that mirror or closely approximate real world scenarios. Test systems may generate test messages that are sent to a system under test (SUT), where the test messages or modified versions of the test messages may be returned to the test systems by the SUT.

Some test systems may include data integrity check values (DICVs) in each test message such that the test systems can validate data content (e.g., message data) in the test message when the test message is returned by the SUT. Some examples of DICVs may include a hash function generated value, a checksum, an error-correcting code, a cyclic redundancy check (CRC), or an error-detecting code.

When testing an SUT, test systems may use message capture mechanisms and/or techniques to store messages sent and/or received during a test session. However, message capture can be resource intensive especially when attempting to capture messages traversing a high-speed link. To minimize the resources needed for message capture, it may be beneficial to store messages using tokens and/or using a compressed format.

In accordance with some aspects of the subject matter described herein, equipment, techniques, methods, or mechanisms are disclosed for token based message capture. For example, a computing platform (e.g., a testing platform, a device, or a node) or a module (e.g., a field-programmable gateway array (FPGA), an application-specific integrated circuit (ASIC), or software executing on a processor) may be configured to compute or generate a token indicating message data and a DICV for a test message prior to sending the test message to a SUT. In this example, the token may be a message content identifier or other information for identifying message data and the DICV may be computed or generated based on at least a portion of the message data. Continuing with this example, after receiving, from the SUT, a version of the test message containing the token and the DICV, the computing platform or the module may store a representation of the test message (e.g., in a compressed format) using the token and the DICV.

In accordance with some aspects of the subject matter described herein, equipment, techniques, methods, or mechanisms are disclosed for using an a DICV and/or an anticipated DICV (ADICV) for determining delta information associated with token based message capture. For example, a computing platform or a module as described herein may receive a DICV or an ADICV in a message from a SUT. In this example, the ADICV may be computed by the computing platform or the module prior to the message being sent to the SUT and may be based on expected modifications of message data by the SUT. Continuing this example, the received test message may be analyzed using the DICV or ADICV for determining whether changes or differences exists relative to message data associated with a token in the test message. If changes or differences exist, a representation of the test message may be stored that includes the token and delta information (e.g., information that indicates differences between actual message data of a test message and message data represented by a token in the test message), whereby the token and the delta information can be used to reconstruct the test message.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
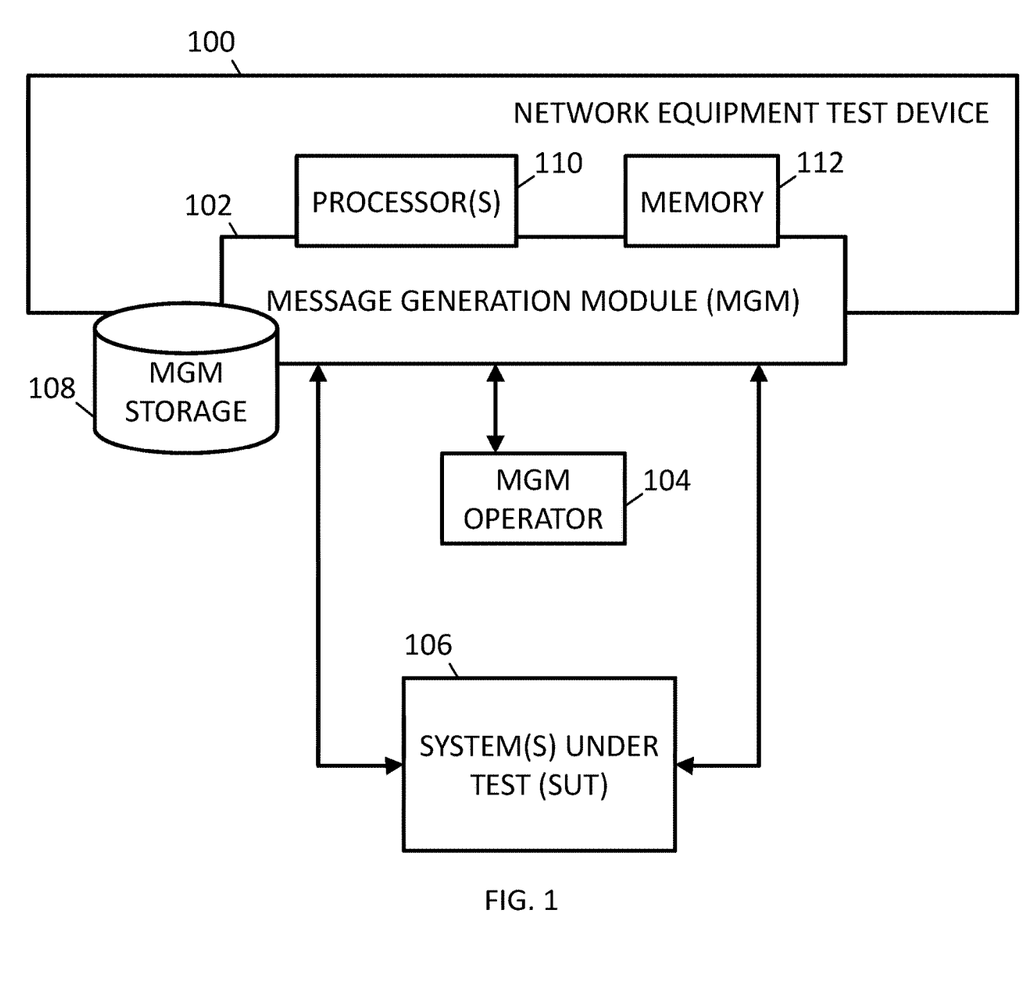
FIG. 1 is a diagram illustrating a network equipment test device for token based message capture.

FIG. 1 is a diagram illustrating a network equipment test device 100 for token based message capture. Network equipment test device 100 may represent any suitable entity or entities (e.g., one or more testing platforms, nodes, or devices) associated with sending or receiving traffic (e.g., one or more messages or other data units). For example, network equipment test device 100 may generate a substantial amount of traffic for testing one or more system(s) under test (SUT) 106. In this example, network equipment test device 100 may receive traffic from SUT 106 and analyze one or more performance related aspects associated with SUT 106.

In some embodiments, network equipment test device 100 may be a stand-alone tool, a testing device, or software executing on at least one processor. In some embodiments, network equipment test device 100 may be a single device or node or may be distributed across multiple devices or nodes. In some embodiments, network equipment test device 100 may include one or more modules for performing various functions. For example, network equipment test device 100 may include a network node emulation module for emulating a node or device that communicates with SUT 106.

Network equipment test device 100 may include one or more processor(s) 110, a memory 112, and a message generation module (MGM) 102. Processor(s) 110 may represent or include a physical processor, a general purpose microprocessor, a single-core processor, a multi-core processor, a field-programmable gateway array (FPGA), and/or an application-specific integrated circuit (ASIC) for executing software and/or logic stored in memory 112. Memory 112 may represent one or more computer readable media for storing data, logic, or other information.

MGM 102 may be any suitable entity or entities (e.g., software executing on a processor, an ASIC, an FPGA, or a combination of software, an ASIC, or an FPGA) for performing one or more aspects associated with processing (e.g., receiving, generating, sorting, analyzing, and/or sending) messages (e.g., packets, frames, and/or other data units). In some embodiments, MGM 102 may be implemented using processor(s) 110 and/or memory 112. For example, MGM 102 may utilize processor(s) 110 (e.g., using software stored in memory 112) to generate test messages for a number of emulated flows or sessions. In this example, MGM 102 may also utilize processor(s) 110 to perform various tests and/or analyses involving test messages and/or related responses from SUT 106.

In some embodiments, MGM 102 may include one or more communications interfaces, e.g., one or more network interface cards (NICs), for interacting with users, modules, and/or nodes. For example, MGM 102 may use one or more communications interfaces for receiving various types of data units and one or more communications interfaces sending various types of data units. Example data or message types include IP messages, Ethernet frames, Ethernet messages, PDUs, datagrams, UDP messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, MGM 102 may include or provide a communications interface for communicating with MGM operator 104. MGM operator 104 may be any entity (e.g., an automated system or a device or system controlled or controllable by a human user) for selecting and/or configuring various aspects associated with storing message related data and/or generating message related metrics. For example, various user interfaces (e.g., an application user interface (API) and a graphical user interface (GUI)) may be provided for providing configuration information, such as a time out period for assuming message loss, types of metrics to be generated, frequency of metric generation, a number of messages per flow to be generated, a number of messages per port tuple to be generated, and/or a number of flows to emulate in a test scenario.

In some embodiments, MGM 102 may include one or more communications interfaces for interacting with SUT 106. For example, MGM 102 or another entity may be configured to send or receive test messages to or from one or more ports (e.g., ports 1, 2, and/or 3) associated with SUT 106. SUT 106 may be any suitable entity or entities (e.g., devices, systems, or platforms) for communicating with network equipment test device 100 and/or receiving, processing, forwarding and/or sending one or more test messages. For example, SUT 106 may include a network router, a network switch, a network device, a server, or a network controller. In another example, SUT 106 may include one or more systems and/or computing platforms, e.g., a data center or a group of servers and/or routers. In yet another example, SUT 106 may include one or more networks or related components, e.g., an access network, a core network, or the Internet.

In some embodiments, one or more user interfaces for testing SUT 106 and/or for providing configuration information may support automation e.g., via one or more scripting languages, a representation state transfer (REST) API, a command line, and/or a web based GUI. For example, MGM operator 104 may use a web browser to interact with a web based GUI associated with programming or configuring one or more aspects for testing SUT 106.

In some embodiments, e.g., a test session comprising serially repeated transmissions of fixed sequences or groups of test messages (e.g., IP packets), MGM 102 or a related entity may achieve significant capture compression ratios using storage and tokenization of transmitted and received test messages. For example, the contents of a test message transmitted to SUT 106 may be associated with a token value (e.g., which may be a smaller in size relative to the size of the contents of the test message it represents). In this example, after the test packet returns from SUT 106 to a receive port of MGM 102, the token associated with the received test packet is stored in a buffer, a memory, or a capture file, e.g., instead of the full contents of the test packet. Continuing with this example, if the contents of the test packet have been modified by SUT 106, then the token may be stored along with delta/change information, such that the token and the delta represent the contents of the received test packet.

In some embodiments, storing message capture related information (e.g., tokens and/or other information) may use less storage space than storing exact copies of test messages. For example, where a test session includes sending 10,000 messages with the same payload, MGM 102 may store a data entry representing each message, where each data entry includes a two-byte token that represents 98 bytes of payload data, thereby avoiding storing 98 bytes for every data entry. In this example, MGM 102 may store the 98 bytes of payload data once in a data store that is indexed by the two-byte token and may generate, derive, reconstruct, or obtain each test message by using the token and the data store to obtain the 98 bytes of payload data.

In some embodiments, additional storage space may be saved by compressing message capture related information using one or more data compression algorithms, such as deflate, bzip2, and/or others. For example, tokens and/or related information may be compressed using a zip compression algorithm.

In some embodiments, prior to reconstructing test messages from a buffer, a memory, or a capture file, MGM 102 or a related entity may decompress message capture related information using one or more decompressing algorithms. For example, if capture data was compressed using one or more data compression algorithms (e.g., a deflate data compression algorithm), one or more corresponding decompression algorithms (e.g., an inflate data compression algorithm) may be used to decompress the data into message capture related information, such as tokens and delta information.

In some embodiments, MGM 102 or a related entity may reconstruct test messages using tokens and one or more token data stores that include message contents indexed by tokens. For example, to reconstruct a particular test message, MGM 102 may use a stored token associated with a data entry corresponding to the test message to lookup or obtain corresponding message data from the token data store. Continuing with this example, MGM 102 may use this obtained message data along with any delta information and/or other stored information (e.g., timestamps or time related tokens) to reconstruct or obtain the test message.

In some embodiments, MGM 102 may include functionality for generating and/or including one or more tokens in messages for testing SUT 106. For example, MGM 102 may include a message token indicating at least some message data (e.g., payload information or a portion thereof) of a test message. In another example, a time related token may be generated and stored for indicating a particular time that one or more test messages were transmitted or received. In this example, a time related token may indicate time relative to an expected time of transmission or reception and, as such, may be smaller in size (e.g., less bits) than a complete timestamp.

In some embodiments, time related tokens or relative time information may be used to identify a particular time that a test message is received or transmitted. For example, time related tokens may be used to indicate time related differences between expected transmission or reception times and actual transmission or reception times. Some example time related tokens include a 'delay of X units' token indicating that message transmission or reception is delayed by a number of units (e.g., caused by pausing a test session), a 'message received with jitter of X units' token indicating that message transmission or reception of a particular message is faster or slower than expected by a number of units (e.g., caused by processing issues), and a 'X message(s) received on time' token indicating that a certain number of message were received on time. Some example units may include a microsecond (µs), a millisecond (ms), a second (s), and/or other time units.

In some embodiments, time related information indicating when a message is transmitted or received may be stored relative to a particular accuracy and/or precision threshold. For example, MGM 102 may store a time related delta value based on the difference between the scheduled or expected receive time and the actual receive time of a message, which may be rounded down to the relevant precision, e.g., the nearest millisecond or second.

In some embodiments, e.g., where expected receive or transmit times are known or discernible, no time related information indicating when a message is transmitted or received may be stored. For example, if after rounding a time related delta value for a message to a relevant precision, the time related delta value is zero, then no timestamp data for the message may be stored. In this example, MGM 102 or a related entity may discern that a blank or null time value indicates that a particular message was received at an expected or scheduled time, e.g., based on a known start time, any known delays or jitter issues, an average latency, a known reception rate, and/or a known transmission rate.

In some embodiments, various time related data, e.g., time related tokens and/or other data, may be compressed using one or more compression algorithms. For example, each time related token for one or more test messages may be compressed to reduce the amount and/or size of time related reception information stored for message capture relative to conventional message capture systems that store complete timestamps for all received messages.

In some embodiments, MGM 102 may include functionality for generating and/or including one or more DICVs or ADICVs in test messages usable for testing SUT 106. In some embodiments, a DICV or an ADICV may be computed based on particular portions of message data such that one or more portions of message data are ignored or not used in generating the DICV or the ADICV. For example, various messages, such as Ethernet frames and Internet protocol (IP) packets, may include header parameters or fields for DICVs (e.g., a checksum or a CRC). In this example, for a given message, a DICV may be computed based on at least some message data that is to be transmitted in the message to SUT 106. In another example, prior to a test message being sent to SUT 106, an ADICV may be computed based on expected message data after the test message is processed by SUT 106. Additional information regarding ADICVs and DICVs is discussed in U.S. patent application Ser. No. 15/079,016 entitled "METHODS, SYSTEMS, AND COMPUTER READABLE MEDIA FOR PROVIDING AN ANTICIPATED DATA INTEGRITY CHECK", filed Mar. 23, 2016; the disclosure of which is incorporated herein by reference in its entirety In some embodiments, MGM 102 may include functionality for storing one or more tokens in a data store (e.g., a data structure or a database in memory 112) and may use the tokens as index values (e.g., keys) for identifying related information, e.g., test message information, validation maps, test metrics, and/or stream information. For example, after receiving a test message from SUT 106, MGM 102 may identify a token in the test message and use the token to identify a validation map which indicates message portions of a test message to use when computing a DICV. In this example, MGM 102 may also use a token to identify message data (e.g., message content) or time data when reconstructing a test message from a message capture file or related data structure.

In some embodiments, MGM 102 may include functionality for performing data integrity analysis involving DICVs or ADICVs. In such embodiments, MGM 102 may generate a reception DICV based on message data in a received message. For example, a reception DICV may be computed using values in a message received from SUT 106. In some embodiments, MGM 102 may determine whether the reception DICV matches a DICV or an ADICV in the received message. If a match is determined, MGM 102 may store the token and any data portions not represented by the token. If a match is not determined (e.g., a reception DICV is different from a DICV in the message), MGM 102 may store the token, delta information, and/or other information for reconstructing the received message.

In some embodiments, MGM 102 may use validation rules and/or validation maps for indicating which bits or message portions to inspect when performing data integrity analyses. For example, a reception DICV may be computed using particular portions (e.g., field values) of a message received by MGM 102 after being processed by SUT 106. In this example, a relevant validation rule or validation map may be identified using one or more tokens in the received message and the validation rule or validation map may indicate which portions of the message to use when generating the reception DICV. In some embodiments, validation rules or validation maps may use a bit and/or byte numbering scheme for indicating which portions are to be used.

In some embodiments, MGM 102 may include functionality for accessing MGM storage 108 or memory 112. MGM storage 108 may be any suitable entity or entities (e.g., a storage device, memory 112, a non-transitory computer readable medium, or a storage system) for maintaining or storing information related to messages and/or related metrics. For example, MGM storage 108 may store message capture related information, such as tokens, delta information, timestamp related data, and/or other information. In this example, message capture related information may be usable to derive, reconstruct, or obtain transmitted test messages and received test messages during one or more test sessions.

In some embodiments, MGM storage 108 may also contain information usable for generating metrics (e.g., statistics) associated with one or more performance aspects of SUT 106. Exemplary message related data may include tokens (e.g., message content tokens, time related tokens, etc.), payload information, header information, and/or other related information, such as validations rules and/or validation maps. In this example, MGM storage 108 may also contain metrics associated with one or more performance aspects of SUT 106 during one or more test scenarios. For example, using configuration information for different tests or test sessions, MGM storage 108 may maintain a particular set of computed metrics for a first test and may maintain another set of computed metrics for a second test. In some embodiments, MGM storage 108 and/or memory 112 may be located at network equipment test device 100, another node, or distributed across multiple platforms or devices.

It will be appreciated that FIG. 1 is for illustrative purposes and that various nodes and/or modules, locations, and/or functionality described above in relation to FIG. 1 may be changed, altered, added, or removed.

Figure 2:
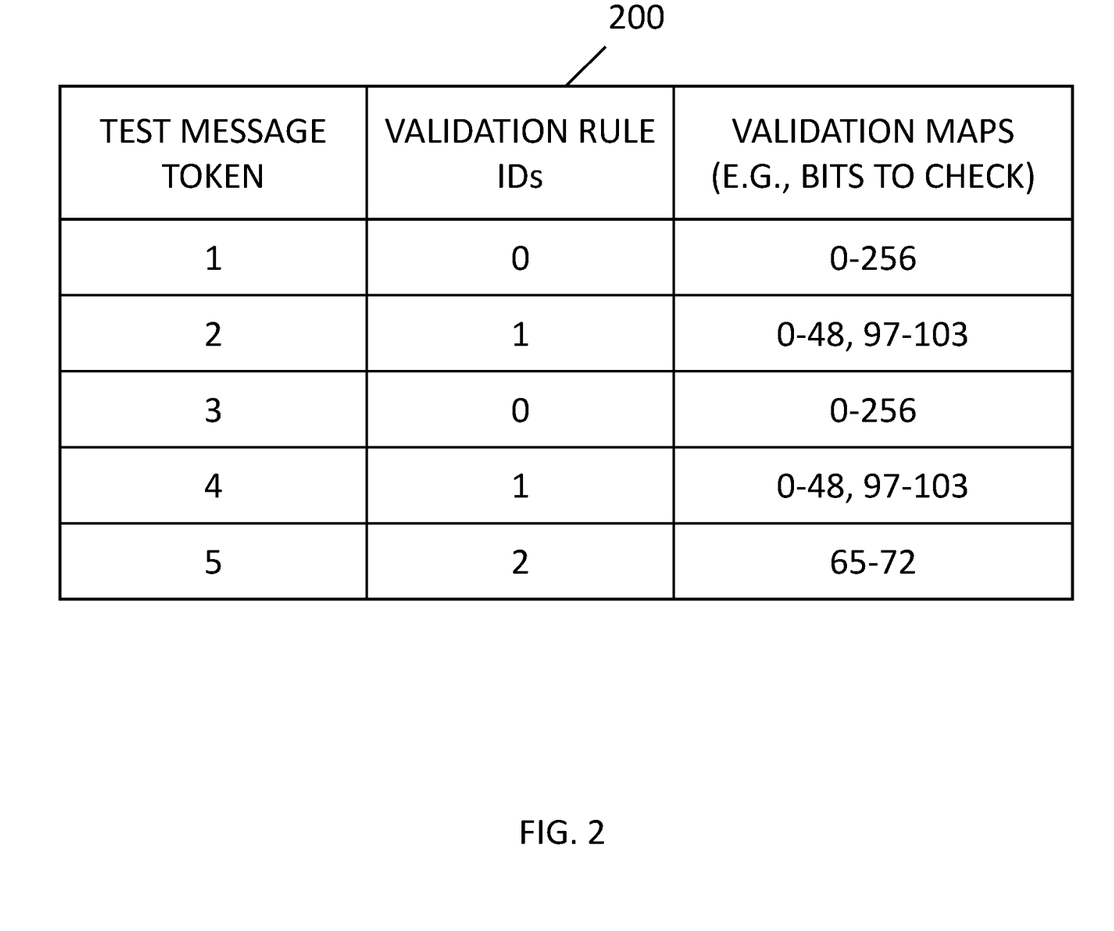
FIG. 2 is a diagram illustrating exemplary data associated with data integrity analysis.

FIG. 2 is a diagram illustrating exemplary data 200 associated with data integrity analysis. In some embodiments, data 200 may be accessed and/or stored by network equipment test device 100 and/or MGM 102 using various data structures. In some embodiments, data 200 may include any suitable information, such as tokens, validation rules, and/or validation maps, usable for performing data integrity analysis. In some embodiments, data 200 may be stored or maintained in MGM storage 108 and/or memory 112 and may be usable for generating DICVs or ADICVs and/or other functions.

Referring to FIG. 2, data 200 may be depicted using a table representing associations between tokens, validation rules, and/or validation maps. For example, a table representing data 200 may comprise columns and/or fields for tokens, validation rules, and/or validation maps, e.g., information indicating which bits of a message or a message header portion to inspect when performing a data integrity analysis.

A token field value may comprise a value, a name, and/or a related identifier for indicating particular message content, a particular message, or a particular message flow. For example, a token field value may be referred to as a template identifier and may identify a particular sequence of bits or bytes of message data in a test message. In another example, a token field value may include a FLID or other suitable identifier, such as a session identifier or a subset of message header information, usable for identifying one or more related messages or message groups. In this example, a token may be one or more bytes and may be unique for a given test session or group of test sessions. In another example, a token may be one or more values, such as a stream identifier and a stream sequence number.

In some embodiments, tokens may be used as keys or index values into a data structure for storing data 200. For example, when MGM 102 receives a message from SUT 106, MGM 102 may use a token (e.g., a message identifier, a stream identifier, a FLID, or other identifier) stored in the message for retrieving, from a data store, a validation rule and/or a validation map associated with the message. In this example, MGM 102 may use the validation rule and/or validation map when performing data integrity analysis associated with the message. Continuing with this example, depending on the outcome of the data integrity analysis, MGM 102 or a related entity may store the token along with any other data (e.g., delta information) or a compressed version of the token and data, thereby storing a representation of the message which can used to reconstruct the message, e.g., when performing message capture analysis.

A validation rule identifier field value may comprise a value, a name, and/or a related identifier for indicating one or more rules or validation maps usable for validating messages or data therein. For example, a validation rule identifier field value may indicate a data structure containing one or more validation rules. In another example, a validation rule identifier field value may indicate a particular validation map to use when performing a data integrity analysis.

A validation map field value may comprise a value, a name, expressions, code, logic, text, and/or a related identifier for indicating one or more portions of a message to use when generating or computing a DICV or ADICV. In some embodiments, a validation map field value may use a bit and/or byte numbering scheme for indicating that a particular portion of a message header is to be used or not to be used when analyzing data integrity of a message. In such embodiments, each validation map or related encoding scheme may be dependent on a particular message format, a data type, or a test session. For example, some validation maps may indicate locations in a header having 256 bytes or more, while other validation maps may indicate locations in a header having less than 256 bytes.

It will be appreciated that data 200 in FIG. 2 is for illustrative purposes and that different and/or additional information may also be stored or maintained. For example, MGM storage 108 and/or memory 112 may store associated tokens and validation maps without storing validation rule identifiers. Further, it will be appreciated that data 200 may be stored in various data structures, memories, media, and/or in one or more locations. For example, MGM 102 may maintain a data structure for storing information about messages being received from SUT 106 and another data structure for storing information about messages being sent to SUT 106.

Figure 3:
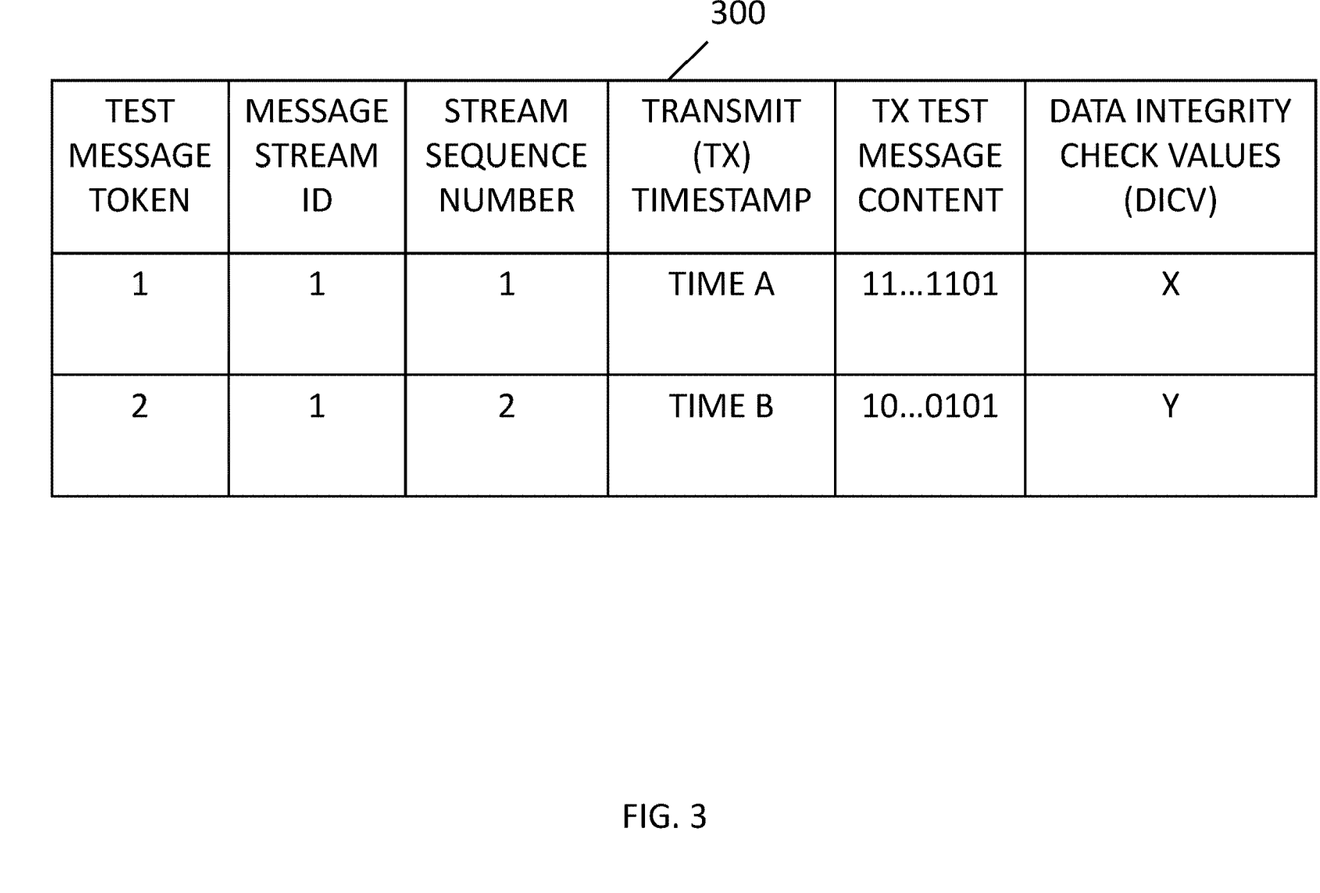
FIG. 3 is a diagram illustrating exemplary data associated with transmitted test messages.

FIG. 3 is a diagram illustrating exemplary data 300 associated with transmitted test messages. In some embodiments, data 300 may be accessed and/or stored by network equipment test device 100 and/or MGM 102 using various data structures. In some embodiments, data 300 may include any suitable information, such as one or more tokens, timestamps, and test message contents, usable for representing test messages. In some embodiments, data 300 may be stored or maintained in MGM storage 108 and/or memory 112 and may be usable for message capture and/or other functions.

In some embodiments, e.g., where each port or communications interface includes MGM 102 or related functionality, some test message information may be preconfigured or predetermined, e.g., some information for a test session may be stored or usable by MGM 102 prior to the test session. For example, network equipment test device 100 or a configuration module may provide a transmit side MGM 102 with an expected test message transmission rate or rates for a given test session and/or may provide tokens, DICVs, and/or payload data for test messages that are to be transmitted. In this example, similar information may also be configured or provided to a receive side MGM 102. In some embodiments, where at least some information is precon figured or provided prior to a test session, network equipment test device 100 and/or various instances of MGM 102 may minimize intra-device and/or inter-port communications and mitigate queuing communications between ports.

Referring to FIG. 3, data 300 may represent test message information associated with test messages transmitted (e.g., from network equipment test device 100 to SUT 106) during a test session and may be depicted using a table. For example, a table depicting data 300 may comprise columns and/or fields for test message tokens, message stream identifiers (e.g., FLIDs), stream sequence numbers (e.g., flow sequence numbers), transmit timestamps or time based tokens, test message contents (e.g., header and/or payload data) and/or DICVs (e.g., checksums).

A test message token field value may comprise a value, a name, and/or a related identifier for indicating a particular test message (e.g., packet) or particular message content (e.g., header and/or payload data) in one or more test sessions. For example, a test message token field value may include any suitable identifier, such as a one-byte or two-byte value, for indicating a unique message or unique message content (e.g., a particular bit or byte sequence representing payload data). In this example, MGM 102 may assign incrementally increasing values to each unique test message or message content. In another example, MGM 102 may assign tokens such that smaller tokens (e.g., in bit size) represent more common messages or message contents and larger tokens (e.g., in bit size) represent more uncommon (e.g., one-off) messages or message contents, thereby reducing the amount of data needed to store test messages when performing token-based message capture. In another example, a test message token field value may include a tuple of data or a subset of message header information, such as a stream identifier and a stream sequence identifier.

A message stream identifier field value may comprise a value, a name, and/or a related identifier for indicating a particular message stream or message flow. For example, a message stream identifier field value may be a FLID or other suitable identifier, such as a session identifier or a subset of message header information, usable for identifying one or more related messages or message groups.

A stream sequence number field value may comprise a value, a name, and/or a related identifier for indicating a particular position that a message is transmitted in a given stream. For example, a stream sequence number field value may be a sequence number or other suitable identifier, such as a TCP sequence number, usable for identifying where a message is transmitted in a message stream relative to other messages in the message stream.

A transmit timestamp field value may comprise a timestamp, a time related token, or other information for indicating a particular time that a test message is transmitted. For example, a transmit timestamp field value may include a time and date or other suitable information, such as delta value based on an expected transmission time, usable for identifying when a message is transmitted by MGM 102.

A test message content field value may comprise a value, a bit or byte representation (e.g., a sequence of bytes or bits, such as '11011111011') or other information for indicating message content (e.g., a header portion and/or a payload portion) of a test message. For example, test message content field value may represent a complete payload of a test message and/or a complete header of the test message. In another example, test message content field value may represent a portion of a message payload and/or a portion of a message header. In this example, the test message content field value may be indexable and/or discernible using a test message token or other information.

A DICV field value may comprise a value, a bit or byte representation (e.g., a sequence of bytes or bits), or other information for validating message content (e.g., actual or expected message data) in the test message. For example, a DICV field value may include a checksum that is computed based on a complete payload of a test message and/or a complete header of the test message. In another example, a DICV field value may include a checksum that is computed based on a portion of a message payload and/or a portion of a message header. In some embodiments, a DICV field value may include an ADICV which may be based on expected message content after processing by SUT 106.

It will be appreciated that data 300 in FIG. 3 is for illustrative purposes and that different and/or additional information may also be stored or maintained. For example, additional tokens and/or other information may be needed to fully and/or accurately represent test messages. Further, it will be appreciated that data 300 may be stored in various data structures, memories, media, and/or in one or more locations. For example, MGM 102 may maintain a data structure for storing information about messages being received from SUT 106 and another data structure for storing information about messages being sent to SUT 106.

Figure 4:
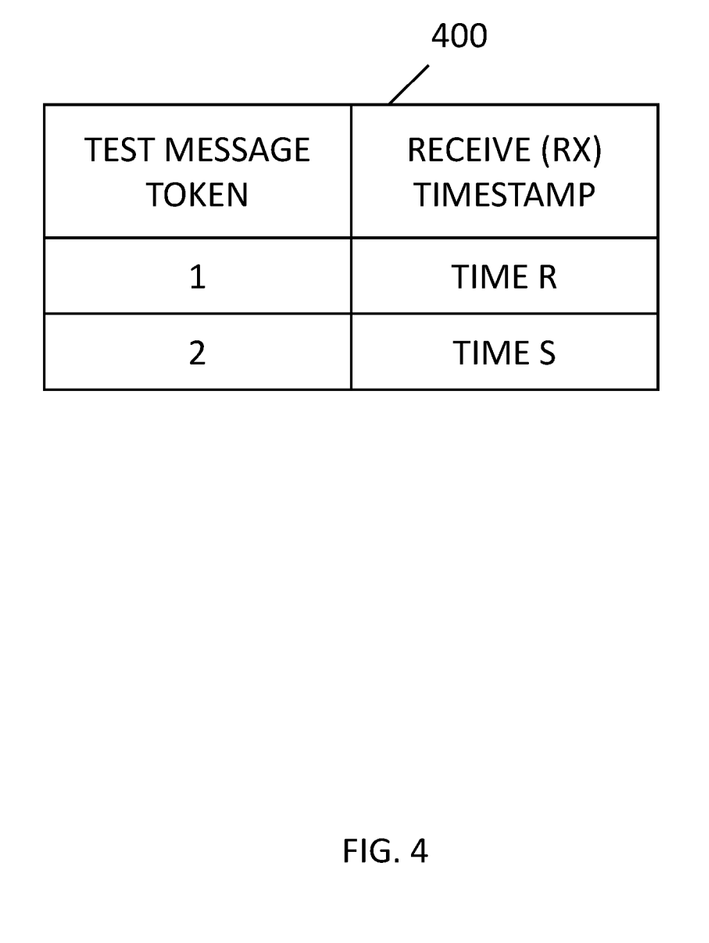
FIG. 4 is a diagram illustrating exemplary data associated with received test messages.

FIG. 4 is a diagram illustrating exemplary data 400 associated with received test messages. In some embodiments, data 400 may be accessed and/or stored by network equipment test device 100 and/or MGM 102 using various data structures. In some embodiments, data 400 may include any suitable information, such as one or more tokens, timestamps, and test message contents, usable for representing test messages. In some embodiments, data 400 may be stored or maintained in MGM storage 108 and/or memory 112 and may be usable for message capture and/or other functions.

In some embodiments, e.g., where each port or communications interface includes MGM 102 or related functionality, some test message information may be preconfigured or predetermined, e.g., some information for a test session may be stored or usable by MGM 102 prior to the test session. For example, network equipment test device 100 or a configuration module may provide a transmit side MGM 102 with an expected test message transmission rate or rates for a given test session and/or may provide tokens, DICVs, and/or payload data for test messages that are to be transmitted. In this example, similar information may also be configured or provided to a receive side MGM 102. In some embodiments, where at least some information is preconfigured or provided prior to a test session, network equipment test device 100 and/or various instances of MGM 102 may minimize intra-device and/or inter-port communications and mitigate queuing communications between ports.

Referring to FIG. 4, data 400 may represent test message information associated with test messages received (e.g., by network equipment test device 100 from SUT 106) during a test session and may be depicted using a table. For example, a table depicting data 400 may comprise columns and/or fields for test message tokens and receive timestamps or time based tokens. In this example, data 400 may be stored for accurately reconstructing test messages received during a test session experiencing no packet ordering errors or packet content corruption errors, e.g., test message tokens can identify received message contents and receive timestamps or time based tokens can be used to obtain, derive, reconstruct, or generate each received test message in the test session.

A test message token field value may comprise a value, a name, and/or a related identifier for indicating a particular test message (e.g., packet) or particular message content (e.g., header and/or payload data) in one or more test sessions. For example, a test message token field value may include any suitable identifier, such as a one-byte or two-byte value, for indicating a unique message or unique message content (e.g., a particular bit or byte sequence representing payload data).

A receive timestamp field value may comprise a timestamp, a time related token, or other information for indicating a particular time that a test message is received. For example, a receive timestamp field value may include a time and date or other suitable information, such as delta value based on an expected receive time, usable for identifying when a message is received by MGM 102.

It will be appreciated that data 400 in FIG. 4 is for illustrative purposes and that different and/or additional information may also be stored or maintained. For example, during a test session, one or more messages may experience stream ordering issues, timing related issues, and/or content corruption issues. In this example, additional tokens and/or other information may be needed to fully and/or accurately represent such messages. Further, it will be appreciated that data 400 may be stored in various data structures, memories, media, and/or in one or more locations. For example, MGM 102 may maintain a data structure for storing information about messages being received from SUT 106 and another data structure for storing information about messages being sent to SUT 106.

Figure 5:
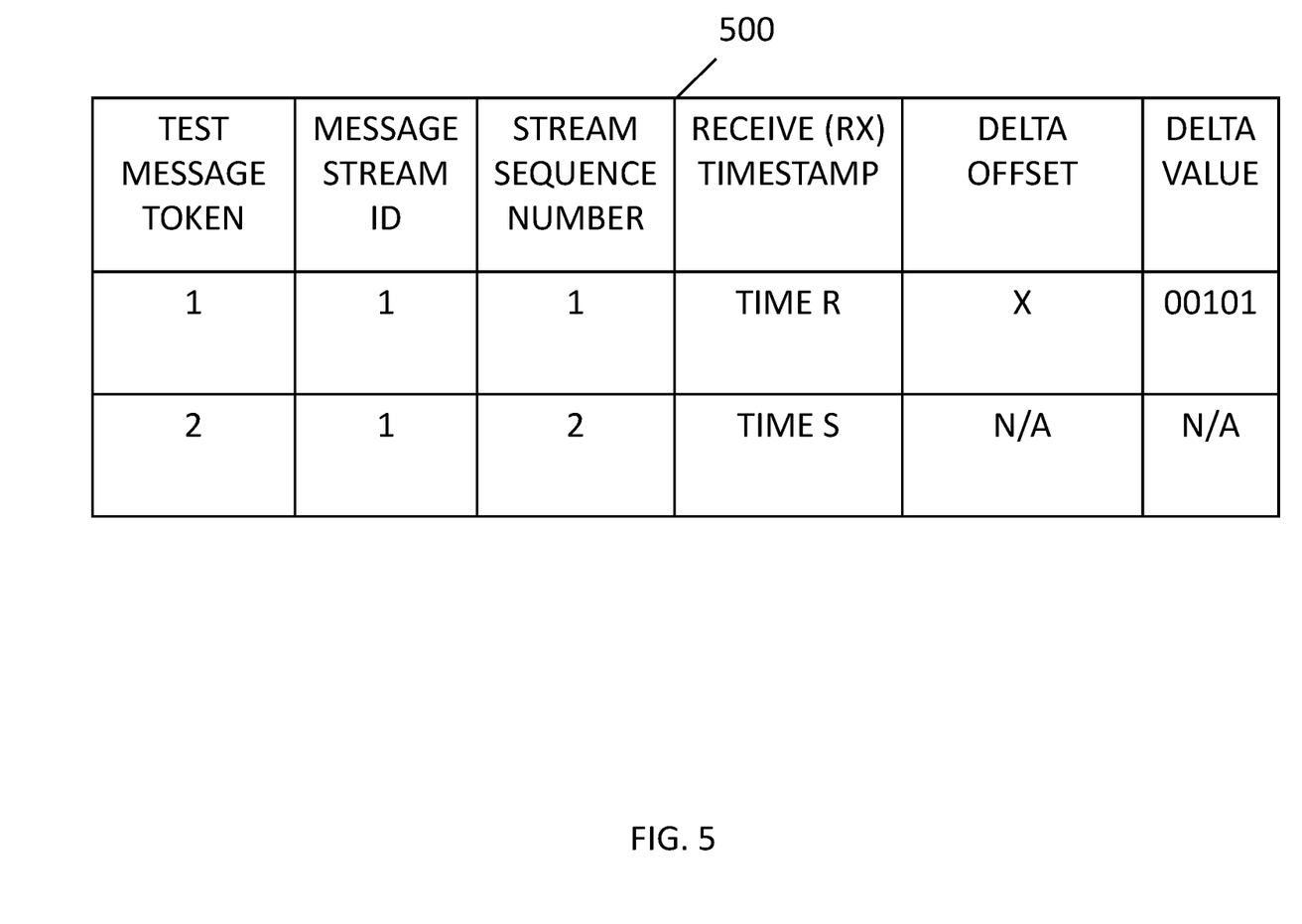
FIG. 5 is a diagram illustrating different exemplary data associated with received test messages.

FIG. 5 is a diagram illustrating different exemplary data 500 associated with received test messages. In some embodiments, data 500 may be accessed and/or stored by network equipment test device 100 and/or MGM 102 using various data structures. In some embodiments, data 500 may include any suitable information, such as one or more tokens, validation rules, and/or validation maps, usable for performing data integrity analysis. In some embodiments, data 500 may be stored or maintained in MGM storage 108 and/or memory 112 and may be usable for message capture and/or other functions.

In some embodiments, e.g., where each port or communications interface includes MGM 102 or related functionality, some test message information may be preconfigured or predetermined, e.g., some information for a test session may be stored or usable by MGM 102 prior to the test session. For example, network equipment test device 100 or a configuration module may provide a transmit side MGM 102 with an expected test message transmission rate or rates for a given test session and/or may provide tokens, DICVs, and/or payload data for test messages that are to be transmitted. In this example, similar information may also be configured or provided to a receive side MGM 102. In some embodiments, where at least some information is preconfigured or provided prior to a test session, network equipment test device 100 and/or various instances of MGM 102 may minimize intra-device and/or inter-port communications and mitigate queuing communications between ports.

Referring to FIG. 5, data 500 may represent test message information associated with test messages received (e.g., by network equipment test device 100 from SUT 106) during a test session and may be depicted using a table. For example, a table depicting data 500 may comprise columns and/or fields for test message tokens, message stream identifiers (e.g., FLIDs), stream sequence numbers (e.g., flow sequence numbers), receive timestamps or time based tokens, delta offsets (e.g., indicators for indicating where in test messages differences between expected message data and actual message data are located) and/or delta values (e.g., data representing differences between expected message data and actual message data). In this example, data 500 may be stored for accurately reconstructing test messages received during a test session, where at least some messages experience ordering errors and content corruption errors.

A test message token field value may comprise a value, a name, and/or a related identifier for indicating a particular test message (e.g., packet) or particular message content (e.g., header and/or payload data) in one or more test sessions. For example, a test message token field value may include any suitable identifier, such as a one-byte or two-byte value, for indicating a unique message or unique message content (e.g., a particular bit or byte sequence representing payload data).

A message stream identifier field value may comprise a value, a name, and/or a related identifier for indicating a particular message stream or message flow. For example, a message stream identifier field value may include a FLID or other suitable identifier, such as a session identifier or a subset of message header information, usable for identifying one or more related messages or message groups.

A stream sequence number field value may comprise a value, a name, and/or a related identifier for indicating a particular position that a message is received in a given stream. For example, a stream sequence number field value may include any suitable identifier, such as a TCP sequence number, usable for identifying where a message is received in a message stream relative to other messages in the message stream.

A receive timestamp field value may comprise a timestamp, a time related token, or other information for indicating a particular time that a test message is received. For example, a receive timestamp field value may include a time and date or other suitable information, such as delta value based on an expected receive time, usable for identifying when a message is received by MGM 102.

A delta offset field value may comprise a value, a bit or byte representation (e.g., a location of bits or bytes where a difference is identified between expected message data and actual message data), or other positional information, for indicating where differences in a test message are located. For example, a delta offset field value may include a dataset or data tuple for indicating multiple portions (e.g., bit locations or ranges) of a test message where differences are identified and/or delta values are needed. In another example, a delta offset may include a single value or other data indicating one portion (e.g., a bit location or range) of a test message where a difference is identified and/or a delta value is needed.

A delta value field value may comprise a value, a bit or byte representation (e.g., a sequence of bytes or bits, such as '11011111011') or other information for representing one or more differences in message content in the test message. For example, a delta value field value may indicate a sequence of bits or bytes that indicate how an actual received test message is different from the test message was expected to be received, e.g., based on a related transmitted test message and expected modifications to the test message by SUT 106. In this example, MGM 102 or a related entity may reconstruct a received test message by accessing an original or an expected test message (e.g., the test message that was transmitted) and may use the delta value to change a portion of the test message, where the portion to change is identified by a delta offset value.

In some embodiments, a delta value field value may include a dataset or data tuple for indicating multiple differences (e.g., at different locations) in the test message. In some embodiments, a delta value field value may include a single value or other data for indicating a difference (e.g., at single location, such as a contiguous data sequence) in the test message It will be appreciated that data 500 in FIG. 5 is for illustrative purposes and that different and/or additional information may also be stored or maintained. For example, during a test session, one or more messages may experience stream ordering issues, timing related issues, and/or content corruption issues. In this example, additional tokens and/or other information may be needed to fully and/or accurately represent such messages. Further, it will be appreciated that data 500 may be stored in various data structures, memories, media, and/or in one or more locations. For example, MGM 102 may maintain a data structure for storing information about messages being received from SUT 106 and another data structure for storing information about messages being sent to SUT 106.

Figure 6:
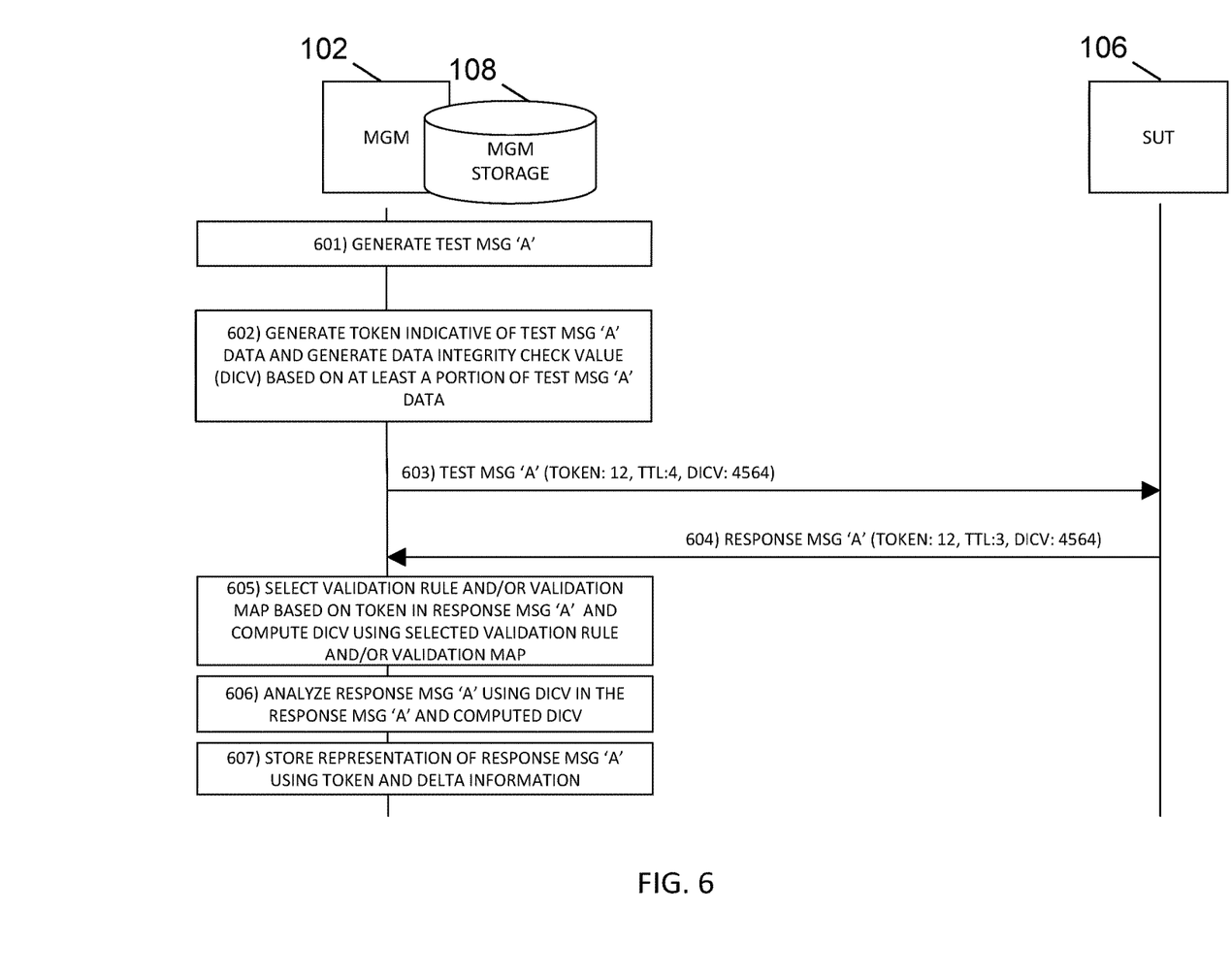
FIG. 6 is a diagram illustrating capturing a message using a data integrity check value (DICV)

FIG. 6 is a diagram illustrating capturing a message using an ADICV. In some embodiments, MGM 102 may use validation rules and/or validation maps for indicating which message data to inspect or validate (e.g., which values to use when computing DICVs or ADICVs). In such embodiments, MGM 102 may associate the validation rules and/or validation maps with one or more tokens (e.g., message identifiers) and may use the tokens in received messages to select validation rules and/or validation maps that are appropriate when analyzing received messages and/or storing tokenized versions of the received messages.

Referring to FIG. 6, at step 601, a test message 'A' may be generated by MGM 102. For example, an IP packet may be generated by MGM 102 and may include particular header parameter or field values, such as a FLID, a TTL value, a source address value, a destination address value, and port information.

At step 602, a token may be generated indicative of test message 'A' content (e.g., payload information and/or header information) and an ADICV may be generated based on expected modifications to test message 'A' by SUT 106. For example, a token may a unique identifier for representing or indicating a particular bit or byte pattern at a particular location in a test message. In this example, the token may be significantly smaller in size than the represented bit or byte pattern, e.g., a token may be eight bits and the represented message data may be 112 bytes.

In some embodiments, an ADICV generated by MGM 102 may be based on one or more predetermined validation rules or validation maps stored in MGM storage 108. For example, MGM 102 may select a validation rule and/or validation map based on a test message token or related message content. In this example, the validation rule and/or validation map may indicate that the first 98 bytes of a message header is to be used for an ADICV.

At step 603, the test message 'A' may be sent from MGM 102 to SUT 106. For example, the test message may include a token, a TTL value, and an ADICV.

In some embodiments, after receiving a test message, SUT 106 may perform one or more processing actions. In such embodiments, a processing action may include modifying message data in the test message, such as modifying an IP TTL value in a message header or changing other header information and/or payload information.

In some embodiments, after modifying a test message, SUT 106 may compute a new DICV and replace an existing DICV with the new DICV, e.g., prior to sending the test message back to MGM 102.

At step 604, a response message 'A' may be sent from SUT 106 to MGM 102. For example, a response message 'A' may represent a test message 'A' after being processed by SUT 106. In this example, the response message may include a same token and an ADICV as the test message 'A', but may include a different TTL value.

At step 605, a validation rule and/or validation map may be selected based on the token in the response message 'A' and a DICV may be computed using the selected validation rule and/or validation map. For example, MGM 102 may use a token in the response message 'A' to identify and/or select a validation rule and/or validation map stored in MGM storage 108. In this example, MGM 102 may compute a reception DICV based on particular portions of the message data in response message 'A', where the particular portions are indicated by an associated validation rule and/or validation map.

At step 606, the response message 'A' may be analyzed using the ADICV in the response message 'A' and the computed DICV. For example, MGM 102 may compare the reception DICV to an ADICV in the response message 'A' and, if the two check values do not match, MGM 102 may store the token and delta information indicating any differences between message data represented by the token and actual message data in the response message 'A'.

At step 607, a representation of the response message 'A' may be stored using the token and delta information. For example, MGM 102 may compute a reception DICV based on particular portions of the message data in response message 'A', where the particular portions are indicated by an associated validation rule and/or validation map. In this example, MGM 102 may compare the reception DICV to a DICV in the response message 'A' and MGM 102 may store a representation of the response message 'A' using the token and delta information indicating any differences between message data represented by the token and actual message data in the response message 'A'.

In some embodiments, a representation of the response message 'A' along with other message representations may be compressed as a capture file using one or more data compression algorithm.

In some embodiments, a representation of the response message 'A' stored may be smaller (e.g., in bits or bytes) than the response message 'A'. For example, instead of storing a complete copy of response message 'A', MGM 102 or a related entity may store a token and delta information that can be used to recover, derive, reconstruct, or obtain the response message 'A'. In this example, the delta information may include a delta offset indicating where in the bit or byte pattern represented by the token a change or difference occurs, and a delta value indicating the bit or byte pattern of the response message 'A' starting from the byte offset, e.g., the portion of the response message 'A' that is different from the test message 'A'.

It will be appreciated that FIG. 6 is for illustrative purposes and that different and/or additional messages and/or actions may be used. It will also be appreciated that various messages and/or actions described herein may occur in a different order or sequence.

Figure 7:
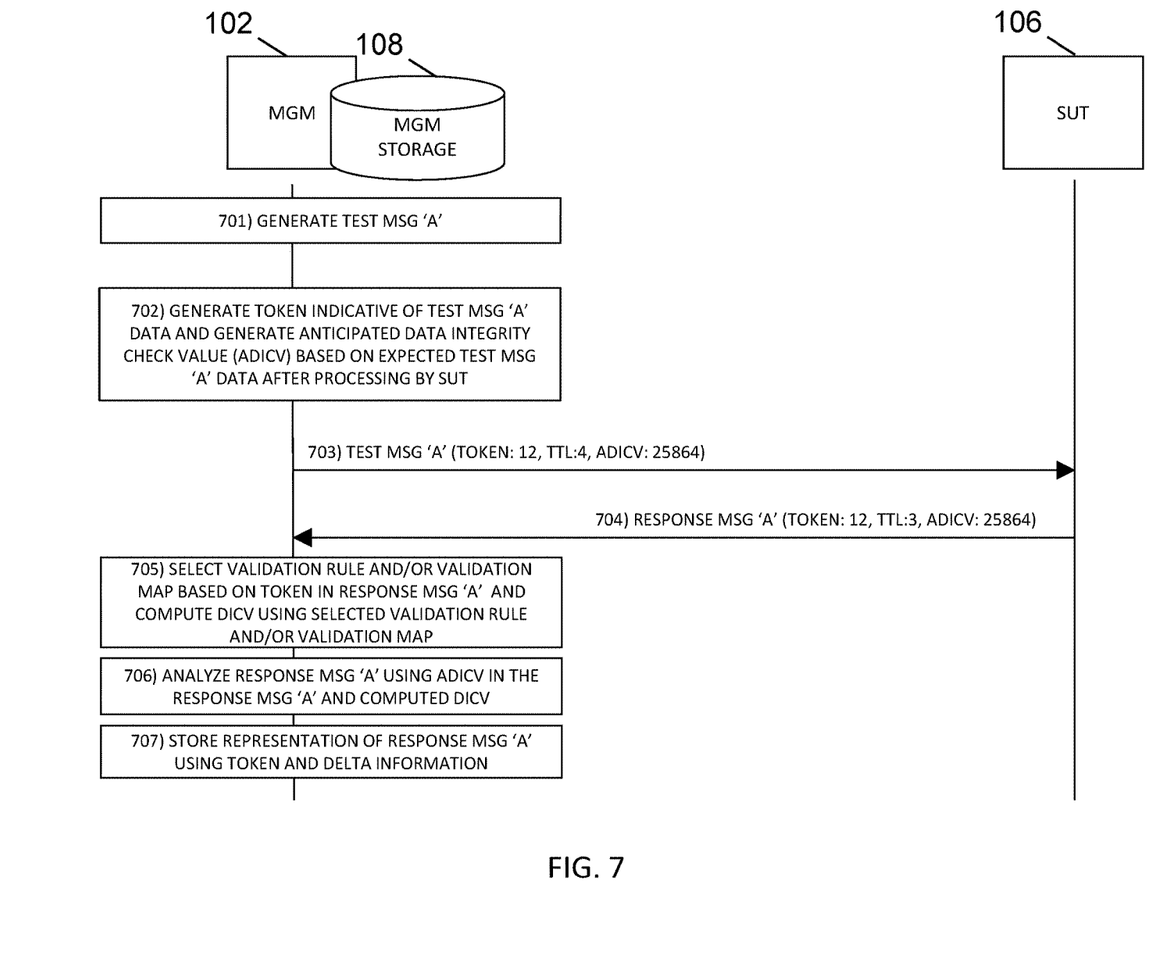
FIG. 7 is a diagram illustrating capturing a message using an anticipated data integrity check value (ADICV)

FIG. 7 is a diagram illustrating capturing a message using an ADICV. In some embodiments, MGM 102 may use validation rules and/or validation maps for indicating which message data to inspect or validate (e.g., which values to use when computing DICVs or ADICVs). In such embodiments, MGM 102 may associate the validation rules and/or validation maps with one or more tokens (e.g., message identifiers) and may use the tokens in received messages to select validation rules and/or validation maps that are appropriate when analyzing received messages and/or storing a compressed version of the received messages.

Referring to FIG. 7, at step 701, a test message 'A' may be generated by MGM 102. For example, an IP packet may be generated by MGM 102 and may include particular header parameter or field values, such as a FLID, a TTL value, a source address value, a destination address value, and port information.

At step 702, a token may be generated indicative of test message 'A' content (e.g., payload information and/or header information) and an ADICV may be generated based on expected modifications to test message 'A' by SUT 106. For example, a token may a unique identifier for representing or indicating a particular bit or byte pattern at a particular location in a test message. In this example, the token may be significantly smaller in size than the represented bit or byte pattern, e.g., a token may be eight bits and the represented message data may be 112 bytes.

In some embodiments, an ADICV generated by MGM 102 may be based on one or more predetermined validation rules or validation maps stored in MGM storage 108. For example, MGM 102 may select a validation rule and/or validation map based on a test message token or related message content. In this example, the validation rule and/or validation map may indicate that the first 98 bytes of a message header is to be used for an ADICV.

At step 703, the test message 'A' may be sent from MGM 102 to SUT 106. For example, the test message may include a token, a TTL value, and an ADICV.

In some embodiments, after receiving a test message, SUT 106 may perform one or more processing actions. In such embodiments, a processing action may include modifying message data in the test message, such as modifying an IP TTL value in a message header or changing other header information and/or payload information.

In some embodiments, after modifying a test message, SUT 106 may compute a new DICV and replace an existing DICV with the new DICV, e.g., prior to sending the test message back to MGM 102.

At step 704, a response message 'A' may be sent from SUT 106 to MGM 102. For example, a response message 'A' may represent a test message 'A' after being processed by SUT 106. In this example, the response message may include a same token and an ADICV as the test message 'A', but may include a different TTL value.

At step 705, a validation rule and/or validation map may be selected based on the token in the response message 'A' and a DICV may be computed using the selected validation rule and/or validation map. For example, MGM 102 may use a token in the response message 'A' to identify and/or select a validation rule and/or validation map stored in MGM storage 108. In this example, MGM 102 may compute a reception DICV based on particular portions of the message data in response message 'A', where the particular portions are indicated by an associated validation rule and/or validation map.

At step 706, the response message 'A' may be analyzed using the ADICV in the response message 'A' and the computed DICV. For example, MGM 102 may compare the reception DICV to an ADICV in the response message 'A' and, if the two check values do not match, MGM 102 may store the token and delta information indicating any differences between message data represented by the token and actual message data in the response message 'A'.

At step 707, a representation of the response message 'A' may be stored using the token and delta information. For example, MGM 102 may compute a reception DICV based on particular portions of the message data in response message 'A', where the particular portions are indicated by an associated validation rule and/or validation map. In this example, MGM 102 may compare the reception DICV to an ADICV in the response message 'A' and MGM 102 may store a representation of the response message 'A' using the token and delta information indicating any differences between message data represented by the token and actual message data in the response message 'A'.

In some embodiments, a representation of the response message 'A' along with other message representations may be compressed as a capture file using one or more data compression algorithm.

In some embodiments, a stored representation of the response message 'A' may be smaller (e.g., in bits or bytes) than the response message 'A'. For example, instead of storing a complete copy of response message 'A', MGM 102 or a related entity may store a token and delta information that can be used to recover, derive, reconstruct, or obtain the response message 'A'. In this example, the delta information may include a delta offset indicating where in the bit or byte pattern represented by the token a change or difference occurs, and a delta value indicating the bit or byte pattern of the response message 'A' starting from the byte offset, e.g., the portion of the response message 'A' that is different from the test message 'A'.

It will be appreciated that FIG. 7 is for illustrative purposes and that different and/or additional messages and/or actions may be used. It will also be appreciated that various messages and/or actions described herein may occur in a different order or sequence.

Figure 8:
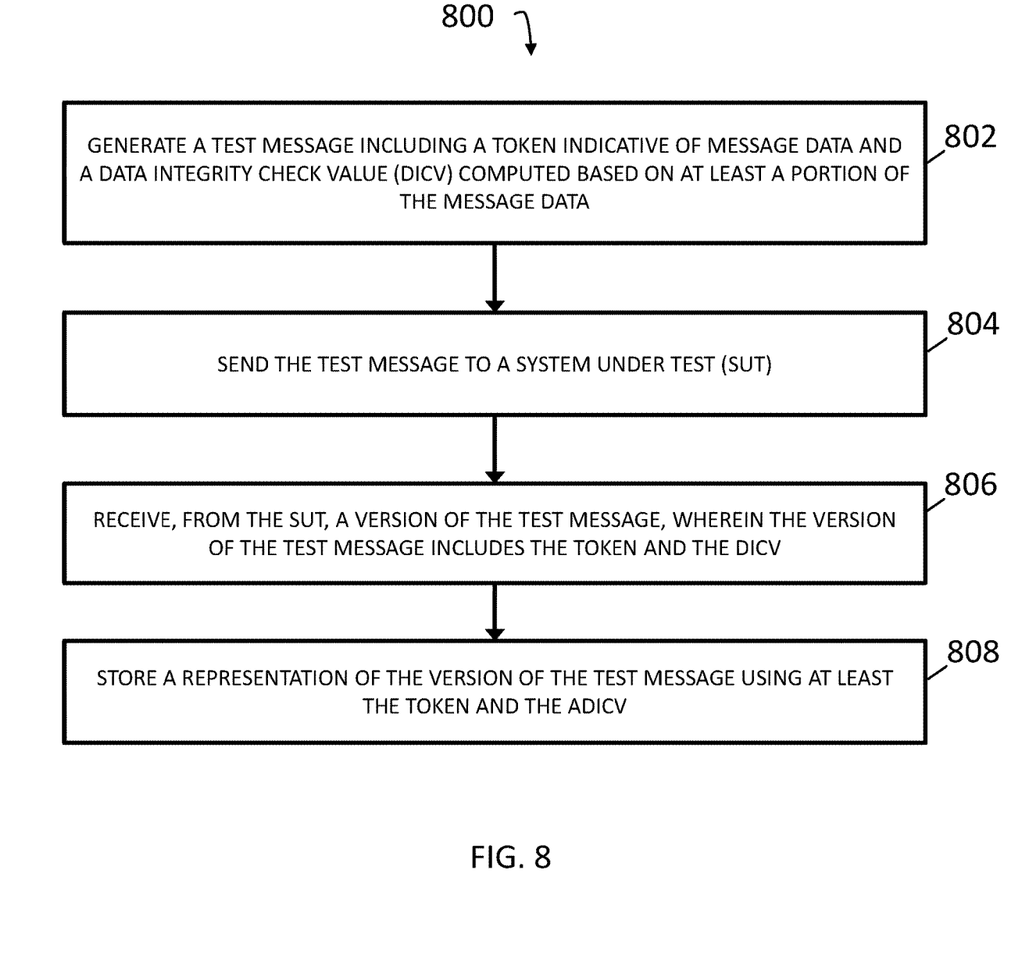
FIG. 8 is a diagram illustrating an exemplary process for token based message capture.

FIG. 8 is a diagram illustrating an exemplary process for token based message capture. In some embodiments, exemplary process 800, or portions thereof, may be performed by or at network equipment test device 100, MGM 102, and/or another node or module. For example, network equipment test device 100 may include at least one computing platform and/or testing platform for testing one or more performance aspects associated with SUT 106.

Referring to process 800, at step 802, a test message may be generated. The test message may include a token indicative of message data (e.g., payload data) and a DICV computed based on at least a portion of the message data. For example, for a particular test message, MGM 102 may generate a test message token for identifying payload data and a DICV based on at least a portion of the payload data. In another example, for a particular test message, MGM 102 may generate a test message token for identifying message data and an ADICV using expected changes of message data in a test message after being processed by SUT 106.

In step 804, the test message may be sent to SUT 106. For example, MGM 102 may send a test message containing a token and a DICV to SUT 106 for processing.

In step 806, a version of the test message may be received from SUT 106 and may include a token and a DICV. For example, SUT 106 may modify a test message sent by MGM 102 and may send the modified version to MGM 102.

In step 808, a representation of the version of the test message may be stored using the token and the DICV. In some embodiments, storing a representation of the version of the test message using the token and the DICV may include analyzing the version of the test message for identifying one or more differences between the test message sent to the SUT and the version of the test message received from the SUT and storing information about the one or more differences.

In some embodiments, reconstructing a test message may be performed. For example, reconstruction may involve using a representation of the version of the test message by identifying, using a stored token associated with the representation of the version of the test message and a data store indexed by the token, original message data and modifying the message data using stored delta information associated with the representation of the version of the test message to obtain the message data of the received test message.

In some embodiments, a DICV and/or the token may be located in a message header field different from an Ethernet CRC field or IP checksum field.

In some embodiments, a DICV and/or a token may be located in a payload portion of the message.

In some embodiments, a DICV may be an ADICV computed based on expected message data after being processed by SUT 106.

In some embodiments, analyzing a version of a test message may include computing a reception DICV using a portion of message data in the version of the test message.

In some embodiments, analyzing a version of a test message may include determining whether a reception DICV and a DICV stored in the version of the test message match.

In some embodiments, a portion of the message data used in computing a reception DICV may be determined using a validation map associated with a token or a test message. For example, validation maps may be stored in a data store and may be indexed using tokens or message identifiers. In another example, a validation map may be located in the test message.

In some embodiments, storing a representation of a version of a test message includes compressing the representation of the version of the test message using one or more data compression algorithms.

In some embodiments, SUT 106 may include a network switch, a network router, or a network device.

It should be noted that network equipment test device 100, MGM 102, and/or functionality described herein may constitute a special purpose computing device. Further, network equipment test device 100, MGM 102, and/or functionality described herein can improve the technological field of packet capture and/or related testing. For example, by generating and using a token to perform token based message capture, messages may be captured quickly, efficiently, and in a compressed form. Further, by using a validation rule and/or a validation map for identifying portions of message data for inspection, compression can be more efficient and/or granular than approaches that involve compressing entire messages or message headers.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for token based message capture, the method comprising:

generating a test message including a token indicative of message data and a data integrity check value (DICV) computed based on at least a portion of the message data;

sending the test message to a system under test (SUT);

receiving, from the SUT, a version of the test message, wherein the version of the test message includes the token and the DICV;

storing a representation of the version of the test message using the token and the DICV, wherein storing the representation of the version of the test message using the token and the DICV includes analyzing the version of the test message for identifying one or more differences between the test message sent to the SUT and the version of the test message received from the SUT and storing delta information about the one or more differences; and reconstructing the version of the test message received from the SUT using the representation of the version of the test message by obtaining, using the token and a data store indexed by the token, original message data and modifying the original message data using the delta information to obtain actual message data of the version of the test message received from the SUT.

2. The method of claim 1 wherein analyzing the version of the test message includes computing a reception data integrity check value (RDICV) using a portion of the message data in the version of the test message.

3. The method of claim 2 wherein analyzing the version of the test message includes determining whether the RDICV matches the DICV in the version of the test message.

4. The method of claim 2 wherein the portion of the message data used in computing the RDICV is determined using a validation map associated with the token or the test message.

5. The method of claim 1 wherein the DICV or the token is located in a payload portion of the test message or a message header field different from an Ethernet cyclic redundancy check (CRC) field or Internet protocol (IP) checksum field.

6. The method of claim 1 wherein the DICV is an anticipated DICV computed based on expected message data after being processed by the SUT.

7. The method of claim 1 wherein storing the representation of the version of the test message includes compressing the representation of the version of the test message using one or more data compression algorithms.

8. A system for token based message capture, the system comprising:

a memory;

at least one processor; and a message generation module (MGM) implemented using the at least one processor and the memory, wherein the MGM is configured for:

generating a test message including a token indicative of message data and a data integrity check value (DICV) computed based on at least a portion of the message data;

sending the test message to a system under test (SUT);

receiving, from the SUT, a version of the test message, wherein the version of the test message includes the token and the DICV;

storing a representation of the version of the test message using the token and the DICV, wherein storing the representation of the version of the test message using the token and the DICV includes analyzing the version of the test message for identifying one or more differences between the test message sent to the SUT and the version of the test message received from the SUT and storing delta information about the one or more differences; and reconstructing the version of the test message received from the SUT using the representation of the version of the test message by obtaining, using the token and a data store indexed by the token, original message data and modifying the original message data using the delta information to obtain actual message data of the version of the test message received from the SUT.

9. The system of claim 8 wherein the MGM is configured for computing a reception data integrity check value (RDICV) using a portion of the message data in the version of the test message.

10. The system of claim 9 wherein the MGM is configured for determining whether the RDICV matches the DICV in the version of the test message.

11. The system of claim 9 wherein the MGM is configured for determining the portion of the message data used in computing the RDICV using a validation map associated with the token or the test message.

12. The system of claim 8 wherein the DICV or the token is located in a payload portion of the test message or a message header field different from an Ethernet cyclic redundancy check (CRC) field or Internet protocol (IP) checksum field.

13. The system of claim 8 wherein the DICV is an anticipated DICV computed based on expected message data after being processed by the SUT.

14. The system of claim 8 wherein the MGM is configured for compressing the representation of the version of the test message using one or more data compression algorithms.

15. A non-transitory computer readable medium comprising computer executable instructions embodied in the non-transitory computer readable medium that when executed by at least one processor of a computer control the computer to perform steps comprising:

generating a test message including a token indicative of message data and a data integrity check value (DICV) computed based on at least a portion of the message data;

sending the test message to a system under test (SUT);

receiving, from the SUT, a version of the test message, wherein the version of the test message includes the token and the DICV;

storing a representation of the version of the test message using the token and the DICV, wherein storing the representation of the version of the test message using the token and the DICV includes analyzing the version of the test message for identifying one or more differences between the test message sent to the SUT and the version of the test message received from the SUT and storing delta information about the one or more differences; and reconstructing the version of the test message received from the SUT using the representation of the version of the test message by obtaining, using the token and a data store indexed by the token, original message data and modifying the original message data using the delta information to obtain actual message data of the version of the test message received from the SUT.

* * * * *